United States Patent
Vizcaino et al.

(10) Patent No.: US 11,225,423 B1
(45) Date of Patent: Jan. 18, 2022

(54) SYSTEMS AND METHODS FOR PASSIVELY DOSING A FLUID WITH CONSUMABLE ADDITIVES

(71) Applicant: Multipure International, Las Vegas, NV (US)

(72) Inventors: Christopher Vizcaino, Denver, CO (US); Zachary Rice, Las Vegas, NV (US)

(73) Assignee: MULTIPURE INTERNATIONAL, Las Vegas, NV (US)

( * ) Notice: Subject to any disclaimer, the term of this patent is extended or adjusted under 35 U.S.C. 154(b) by 0 days.

(21) Appl. No.: 17/329,804

(22) Filed: May 25, 2021

(51) Int. Cl.
  *C02F 1/68* (2006.01)
  *C02F 1/00* (2006.01)

(52) U.S. Cl.
  CPC .............. *C02F 1/688* (2013.01); *C02F 1/003* (2013.01); *C02F 2201/006* (2013.01); *C02F 2307/04* (2013.01)

(58) Field of Classification Search
  CPC .......... C02F 1/688; C02F 1/686; C02F 1/003; C02F 2307/04; C02F 2201/006; E03D 2009/024; E03D 9/038; Y10T 137/4891
  USPC .................................. 210/206, 209; 422/277
  See application file for complete search history.

(56) References Cited

U.S. PATENT DOCUMENTS

| | | | |
|---|---|---|---|
| 991,825 A * | 5/1911 | Bogie | ...................... E03D 9/038 4/227.6 |
| 5,580,448 A | 12/1996 | Brandreth | |
| 6,280,617 B1 | 8/2001 | Brandreth | |
| 6,855,252 B2 | 2/2005 | Brandreth | |
| 8,308,942 B2 * | 11/2012 | Swain | ...................... C02F 1/003 210/256 |
| 8,444,929 B2 | 5/2013 | Brandreth | |
| 10,822,249 B2 | 11/2020 | McDonald et al. | |
| 2008/0020096 A1 | 1/2008 | Blum et al. | |
| 2009/0283466 A1 | 11/2009 | Martin et al. | |
| 2012/0017766 A1 | 1/2012 | Anson et al. | |

(Continued)

FOREIGN PATENT DOCUMENTS

WO   2011143100 A1   11/2011

OTHER PUBLICATIONS

International Search Report and Written Opinion for corresponding International Application No. PCT/US2021/034247, dated Aug. 25, 2021, 13 pages.

*Primary Examiner* — Terry K Cecil
(74) *Attorney, Agent, or Firm* — Greenberg Traurig, LLP; Todd Basile

(57) ABSTRACT

Systems and methods for passively dosing fluid with a consumable additive in a controlled and measured fashion. A capsule containing the additive is placed in a fluid reservoir and passively doses static water in the reservoir over time. Instead of directly exposing the additive to the dispensing system's fluid, fluid within the capsule's internal volume becomes saturated with dissolved additive and then diffuses to the dispensing system's fluid through one or more openings. The one or more openings are sized so the that the diffusion occurs at a predetermined rate, and are positioned on the capsule to prevent an undesirable fluid exchange which extends the life of the additive and maintains a constant diffusion rate. The size of the cartridge can be selected to control the volume of fluid that is passively dosed within the reservoir, thereby controlling an overall concentration of additive in the total volume dispensed.

15 Claims, 10 Drawing Sheets

(56) References Cited

U.S. PATENT DOCUMENTS

| | | |
|---|---|---|
| 2013/0306028 A1 | 11/2013 | Monsallier et al. |
| 2016/0002904 A1* | 1/2016 | Hopkins .................. C02F 1/688 |
| | | 4/227.1 |
| 2016/0150191 A1 | 5/2016 | Karsenti et al. |
| 2017/0156540 A1 | 6/2017 | Wheatley et al. |
| 2020/0255309 A1 | 8/2020 | Leung |

* cited by examiner

Side View

Top View

Top View

Side View

Side View

Top View

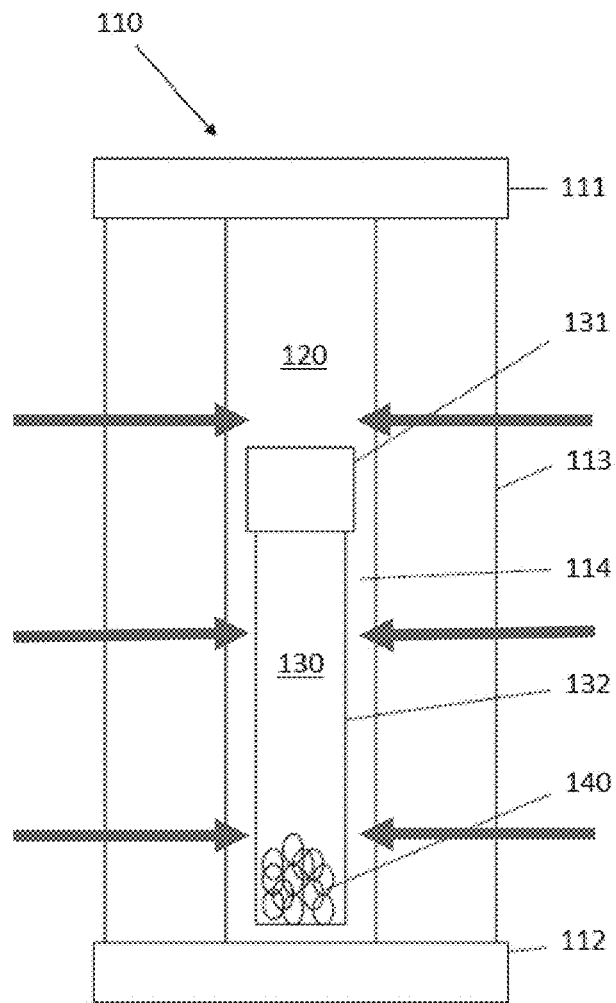
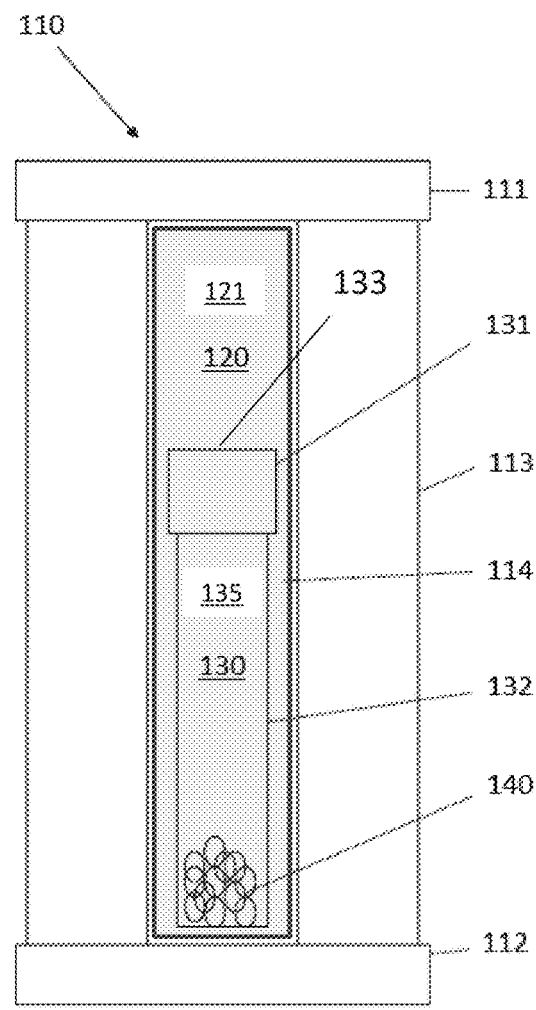
*FIG. 7A*  *FIG. 7B*

SYSTEMS AND METHODS FOR PASSIVELY DOSING A FLUID WITH CONSUMABLE ADDITIVES

FIELD

Embodiments of the disclosure are directed to the dosing of additives to a static and/or dynamic fluid.

BACKGROUND

Many conventional on-demand water filtration systems add consumable additives (e.g., flavoring, minerals, scale inhibitors) to drinking water as it flows through the system. For example, upon request from a user, tap water is directed through a filter element to filter the water, and then filtered water is then actively dosed with additive as it flows toward the exit and ultimately dispensed into the user's cup.

Active dosing approaches (e.g., injection of additive) can be complex and pricey as most require sensors and pumps to achieve a desired concentration. Alternatively, dosing can be performed passively—e.g., by flowing the water over a solid pellet of dissolving additive material or by flowing water through a capsule containing loose additive material. However, such approaches suffer from several drawbacks. Many are incapable of delivering consistent amounts of additive during each use since, for example, the exposed surface area of solid pellets and loose additive material decreases with each use as additive is consumed. Further, many are incapable of controlling the delivered concentration since, for example, some dose the entire volume of fluid to be dispensed (e.g., water filter pitchers), which can result in higher concentrations than desired if left to sit for too long. Still further, many are quickly depleted of additive since, for example, (i) pelletized and loose additive must be highly soluble if dosing flowing water to high concentration, (ii) the additives are subjected to conditions that promote inefficient consumption, such as turbulent flow and uncontrolled dosing conditions (e.g., the above example where a large volume is overdosed. Still further yet, many cannot be retrofitted to work with existing fluid dispensing systems as each requires certain specialized structure.

Therefore, there is a need for a fluid dispensing system that doses the fluid with additive in controlled and consistent amounts while minimizing consumption of the additive.

SUMMARY

The present disclosure is directed to a fluid dispensing system configured for passively dosing a fluid with a consumable additive in a controlled and measured fashion. The fluid dispensing system, in various embodiments, may comprise a fluid reservoir, and a capsule situated within the fluid reservoir and configured to contain an additive material. In some embodiments, the capsule includes (i) a size configured to allow a predetermined volume of fluid to collect within the fluid reservoir ("static fluid volume"), and (ii) one or more openings configured to control a rate at which the additive material diffuses into the static fluid volume from a volume of fluid within the capsule ("capsule fluid volume"). The fluid dispensing system may be configured such that the static fluid volume is passively dosed with the additive material prior to being dispensed from the fluid dispensing system.

According to various embodiments, during each use the fluid dispensing system may be configured to dispense the passively dosed static fluid volume and a volume of flowing fluid ("flowing fluid volume") such that the total volume of fluid dispensed from the fluid dispensing system has a predetermined concentration of the additive material ("total concentration"). In some embodiments, the predetermined concentration of the additive material may be proportional to the concentration of the additive in the passively dosed static fluid volume ("static concentration") and the relative volume of the static fluid volume.

In various embodiments, the fluid reservoir may comprise a hollow core of a filter element. In some embodiments of the fluid dispensing system the capsule may comprise an elongate body having a closed top, a closed bottom, a side wall, and an interior configured to contain the additive material. In some embodiments the one or more openings are positioned in the closed top. Alternatively, one or more openings may be positioned in the side wall according to some embodiments. In various embodiments the closed top may be a removable lid. In an embodiment the one or more openings may be configured to minimize transfer of the additive material from the capsule to the flowing fluid volume.

The fluid dispensing system, using one opening or a plurality of openings each situated at approximately the same lengthwise position on the capsule according to various embodiments, may be configured to minimize a pressure differential between the interior of the capsule and fluid reservoir as the flowing fluid volume flows by the capsule. The capsule fluid reservoir volume (CFRV) and the collective diameter of the one or more openings (COD) may be selected according to some embodiments using the following equation:

$$COD = CFRV * 0.005$$

According to some embodiments, to achieve a total concentration of 10 µg/L-1000 mg/L using the additive material having a solubility of 1 µg/L-1000 g/L in a total volume of 10-1,000,000 gallons fluid to be dispensed from the fluid dispensing system having a fluid reservoir volume of 1-1000 cm3, a capsule volumetric size may be 2-999 cm3, and collective size of the one or more openings (COD) may be 1-26 mm. In some embodiments, the additive material may comprise a scale inhibitor and the fluid may comprise water.

In another aspect, the present disclosure is directed to a method for dosing a fluid with an additive material. In some embodiments, the method may comprise inserting a capsule into a fluid reservoir, wherein the capsule contains an additive material and has a size configured to allow a predetermined volume of fluid to collect within the fluid reservoir ("static fluid volume"). The additive material may be allowed to diffuse from a volume of fluid within the capsule ("capsule fluid volume") into the static fluid volume through one or more openings in the capsule to passively dose the static fluid volume with a concentration of the additive material ("static concentration"). In addition, some embodiments include a method step of dispensing the passively dosed static fluid volume from the fluid reservoir. In some embodiments, the method may include directing a volume of fluid through the fluid reservoir ("flowing fluid volume"), wherein the static fluid volume and the static concentration are selected to impart the total volume of fluid dispensed from the fluid dispensing system with a predetermined concentration of the additive material ("total concentration").

A step of selecting a capsule size, according to various embodiments, may include the difference between a volume of the fluid reservoir and the static fluid volume. In some embodiments, allowing the additive material to diffuse may include allowing a predetermined period of time to pass, where the predetermined period of time may be selected based on at least one or a combination of the desired static concentration, a solubility of the additive material, a temperature of the fluid, a density of the fluid, pH, and electrical impedance.

According to some embodiments, the method may include directing a volume of fluid through the fluid reservoir at least partially concurrent with dispensing the passively dosed static fluid volume from the fluid reservoir. Directing a volume of fluid through the fluid reservoir may occur, in some embodiments, subsequent to dispensing the passively dosed static fluid volume from the fluid reservoir.

The method may further include providing the structure described herein, such a fluid reservoir comprising a hollow core of a filter element according to some embodiments. In some embodiments, the method may include positioning the one or more openings in a closed top of the capsule. In various embodiments the method may include positioning the one or more openings are in a side wall of the capsule. A capsule fluid reservoir volume (CFRV) and a collective diameter of the one or more openings (COD) may, according to various embodiments, be selected according to the following equation:

$$COD = CFRV * 0.005$$

To achieve a total concentration of 10 µg/L-1000 mg/L using the additive material having a solubility of 1 µg/L-1000 g/L in a total volume of 10-1,000,000 gallons fluid to be dispensed from the fluid dispensing system having a fluid reservoir volume of 1-1000 cm3, a capsule fluid reservoir volume (CFRV) may be 2-999 cm3 and the collective size of the one or more openings (COD) may be 1-26 mm according to some embodiments. The method, according to some embodiments, may include a step of selecting a scale inhibitor as the additive material and providing water as the fluid.

BRIEF DESCRIPTION OF DRAWINGS

FIG. 7A illustrates a representative initial setup and operation of a fluid dispensing system.

FIG. 7B shows fluid collecting in a capsule and fluid reservoir.

DETAILED DESCRIPTION

Figure 1A:
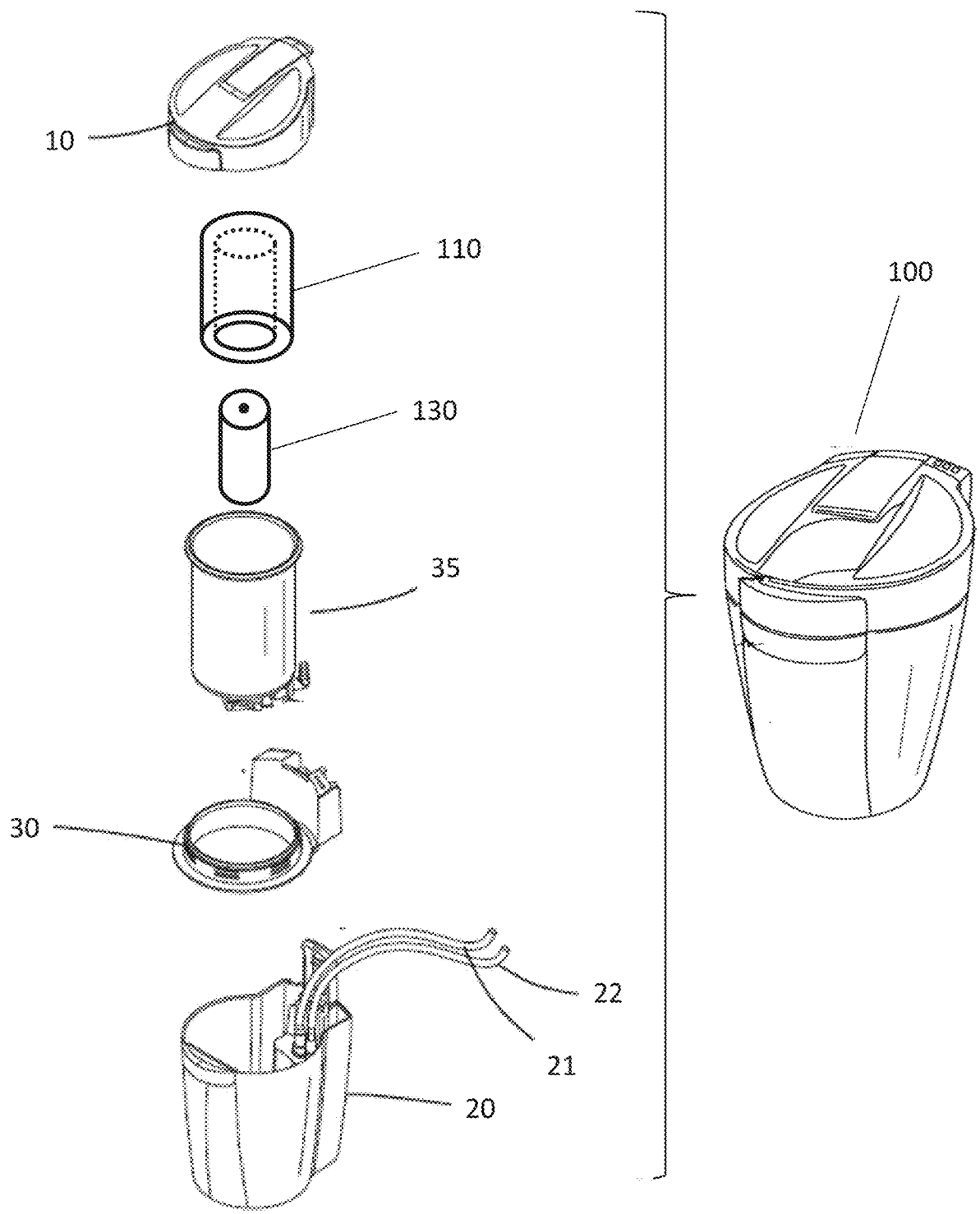
FIG. 1A shows a perspective and exploded view of a representative fluid dispensing system.

Embodiments of the present disclosure include systems and methods for passively dosing a fluid with a consumable additive in a controlled and measured fashion. The system offers numerous benefits over the prior art. For example, prior art systems require a complex arrangement of sensors, pumps, flowmeters, etc. to monitor additive consumption. In contrast, the additive release system of this disclosure needs no monitoring or forced dispensing which results in simplified delivery method with significant manufacturing cost savings. The simplicity of the system also allows easy adaptation into any existing fluid system where a steady timed release of additive is desired.

In addition, the system provides a way to conserve additive by isolating it from degrading fluid flow. Isolating the additive inside a capsule with a reservoir designed to minimize fluid motion results in a more consistent dosing mechanism as compared to the prior art. For example, in conventional dosing arrangements, fluid flowing (i.e., in a dynamic state) past additive pellets cause the pellets to degrade which in turn changes the surface area of the pellet. The difference in surface area cause the additive to be released into the stream at different rates during its lifetime, resulting in an inconsistent dose.

Another advantage is that the additive system described in this application prevents overdosing. In the prior art, additive exposed to a continuous fluid flow will continue to erode until it is completely gone. In contrast, the capsule described herein prevents over-erosion of the additive by isolating it from flowing liquid. In prior art systems, the additive will degrade in idle systems to the point where fluid flow will carry an undesirable amount of additive to a target vessel. This usually requires an exchange of the additive cartridge after long idle periods to prevent this undesirable situation. The fluid inside the capsule reservoir described in this application becomes saturated with additive in solution and which diffuses out the capsule into an external fluid filled volume at a consistent rate. The system has the added benefit that once the external fluid filled volume reaches the same saturation equilibrium, diffusion will cease, and the system will remain at equilibrium until a fluid flow carries the external fluid away. Therefore, the system prevents overdosing in systems that may remain idle for extended periods of time.

For ease of explanation, the systems and methods disclosed herein may be described in the context of water filtration, wherein the filtered fluid is filtered water and the consumable additive; however, the present disclosure is not intended to be limited as such. Instead, it should be recognized that the systems and methods for passively dosing a filtered fluid may be applied to any suitable fluid, in combination with any consumable additive. Further, while the systems and methods disclosed herein may be described in the context of filtration systems, it should be recognized that filtration is, in various embodiments, optional, as the present systems and methods may be adapted to dose unfiltered fluid with consumable additives in similar manner.

Fluid Dispensing System 100

FIG. 1A shows a perspective and exploded view of a representative fluid dispensing system 100 similar to that disclosed in prior art U.S. Pat. No. 9,783,430 to Rice, which is incorporated by reference herein in its entirety for all purposes. The representative fluid dispensing system 100 generally includes a lid assembly 10, housing assembly 20, ring enclosure 30, and a pressure vessel 35 for receiving a filter element 110 and a capsule 130. The housing assembly 20 and ring enclosure 30 can be a single, integral unit such that the lid assembly 10 attaches directly to the housing assembly 20. A source water line (inlet) 21 and filtered water line (outlet) 22 connect to the housing assembly 20 and serve to receive source water in need of filtration and dispense filtered water.

Figure 1B:
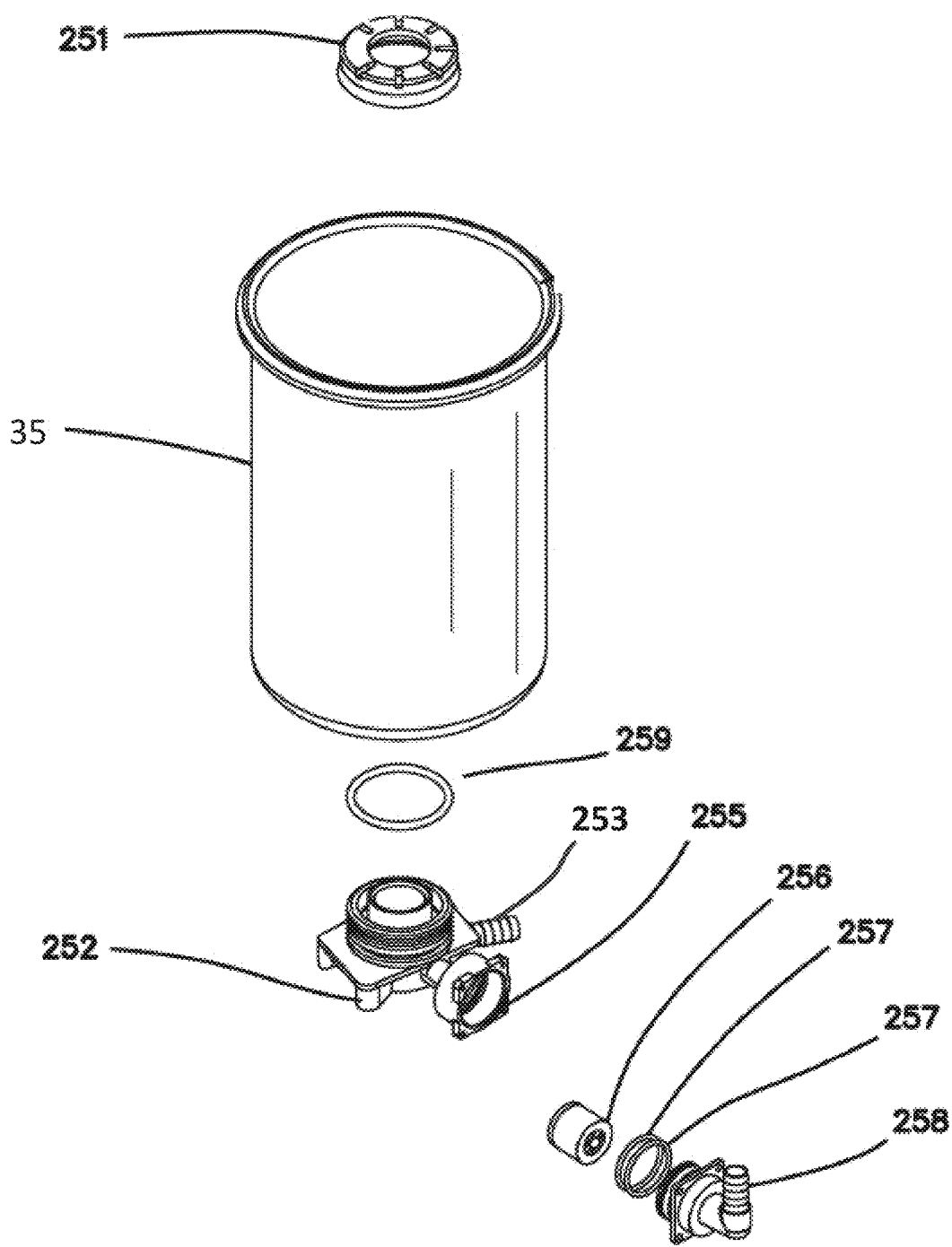
FIG. 1B shows an exploded view of a representative pressure vessel subassembly of the fluid dispensing system of FIG. 1A.

FIG. 1B shows an exploded view of a representative pressure vessel subassembly of the fluid dispensing system 100 of FIG. 1A. The pressure vessel sub-assembly comprises broadly the pressure vessel 35, exit fitting 251, fluid inlet 252, impeller module housing 255, impeller module 256, O-rings 257, elbow fitting 258 and exit gasket 259. The impeller module 255 is configured to move purified water into purified water line (outlet) 22. In one embodiment, the pressure vessel 35 is fabricated of stainless steel.

Water enters the pressure vessel 35 through the barbed port 253 on the entry/exit fitting 252. The water then flows out fitting 253 through port 255. In this embodiment, the filter 110 sits inverted in the pressure vessel 35 so the water exits out the bottom through fitting 253. In some other filtration system embodiments, such as those presented in FIGS. 2-7E, the water exists out the top of the system. However, the dosing mechanism provided by capsule 130 works the same whether water flows from the top or bottom of filter 110. Whether the filter 110 is inverted or upright, the capsule 110 should be upright such that gravity keeps the additive 140 at the bottom of the capsule fluid reservoir 134 and rising gas is allowed to escape through the opening(s) 133.

Figure 2:
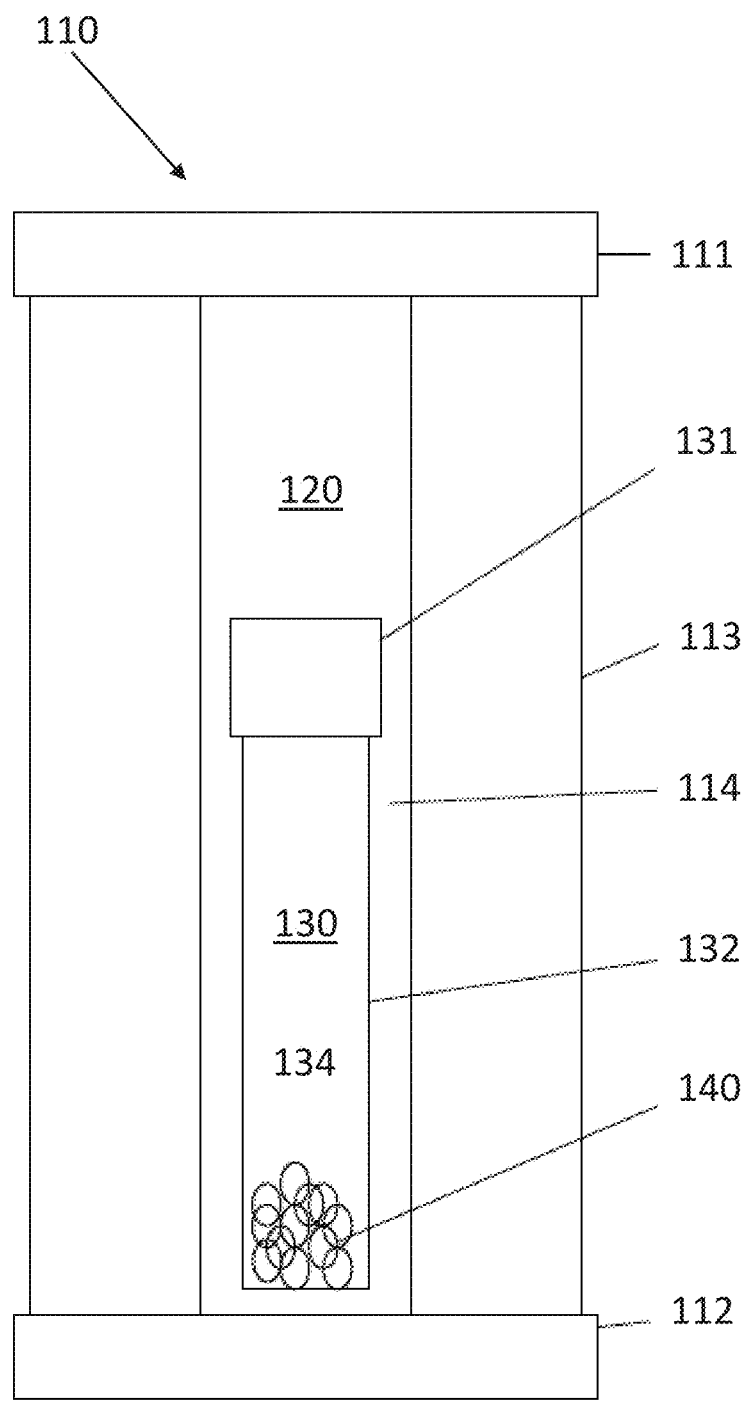
FIG. 2 shows a representative embodiment of fluid dispensing system comprising filter element, fluid reservoir, and capsule.

Regardless of its embodiment as a water filtration system or otherwise, fluid dispensing system 100, in various embodiments, may generally comprise one or more of (i) a filter element 110 for filtering the water, (ii) a fluid reservoir 120 in fluid communication with the filter element 110 in which filtered water collects after use, and/or (iii) a capsule 130 containing an additive 140 residing in fluid reservoir 120, as best shown in the cross sectional view of FIG. 2. Generally speaking, system 100 may be configured to passively dose a volume of static, filtered water residing in fluid reservoir 120 between uses and, during use, dispense the dosed volume of filtered water along with another volume of filtered water that predominantly bypasses capsule 130 without being dosed due at least in part to the particular construction of capsule 130, as described in more detail herein.

It should be recognized that filter element 110 may be optional, such as in embodiments where pre-filtered fluid or unfiltered fluid are to be dosed with additive 140 (not shown), in which case fluid reservoir 120 may be in direct fluid communication with a source of the pre-filtered or unfiltered fluid. In such cases, fluid reservoir 120 may alternatively be embodied by pressure vessel 35 itself or by any other vessel or fixed-volume structure configured to accommodate capsule 130 therein, store a static volume of fluid about capsule 130 so as to permit diffusion of additive 140 into the static volume of fluid, and permit a flowing volume of fluid to enter and be dispensed therefrom. For example, in some embodiments, fluid dispensing system 100 may be connected downstream of a reservoir of already-filtered fluid (e.g., a drinking water tank) or fluid that need not be filtered for a particular application (e.g., potable water storage, chemical mixing systems) and as such, may omit filter element 110, replacing it instead with a vessel or other fixed-volume structure to serve as fluid reservoir 120.

Filter Element 110

FIG. 2 shows a representative embodiment of fluid dispensing system 100 comprising filter element 110, fluid reservoir 120, and capsule 130. Filter element 110, in various embodiments, can be any conventional, commercially available filter that includes a core 114 with internal volume capable of housing capsule 130. In this example, filter element 110 includes a top cap 111, a bottom cap 112, and an elongated body 113, each of which defines the walls of a substantially hollow core 114. While the elongated body 113 is shown as tubular in this embodiment, the shape is not critical so long as it is capable of accommodating the capsule 130 and a predetermined volume of fluid within its hollow core 114.

Fluid Reservoir 120

In the present embodiment, hollow core 114 defines a fluid reservoir 120 in which a volume of fluid collects and sits static between uses of fluid dispensing system 100. As later described in more detail, during use, fluid dispensing system 100 directs fluid through at least a portion of the elongated body 113, into filtered fluid reservoir 120, and out one or more openings in the top cap 111 for dispensing from fluid dispensing system 100. After flow through the system ceases, some fluid remains in fluid reservoir 120 and is passively dosed with additive 140 according to the principles further described herein.

Capsule 130

FIGS. 3A-3C and FIGS. 4A-4C show capsule 130 according to various embodiments of the present disclosure. Capsule 130, in various embodiments, may generally include a closed top 131 (shown and described here as a removable capsule lid), a substantially hollow capsule body 132 with a closed bottom, and one or more openings 133. Generally speaking, closed top 131 and capsule body 132 may cooperate to define a capsule fluid reservoir 134 within capsule 130 in which additive 140 is contained, and opening(s) 133 may be configured to place capsule fluid reservoir 134 into fluid communication with fluid reservoir 120 and thereby allow additive 140 to diffuse from fluid residing within capsule fluid reservoir 134 (hereinafter referred to as "capsule fluid volume 135") into static fluid residing in fluid reservoir 120 between uses of fluid dispensing system 100 (hereinafter referred to as "static fluid volume 121"), as later described in more detail herein. Such diffusion may be referred to herein as "passive dosing," (or derivatives thereof) due to the passive nature in which capsule 130 doses static fluid volume 121 with additive 140 (i.e., via diffusion between static volumes of fluid).

Additive 140, in various embodiments, may comprise any substance that, when delivered into fluid to be dispensed from fluid dispensing system 100, changes the chemistry of the fluid to accomplish a specific result. Suitable substance types include one or more of scale inhibitors, flavor additives, cleaning solutions, color additives, and/or any conventional additive commercially available capable of dissolving in solution. Other example systems compatible with the principles described herein include mineral dosing (e.g., calcium, magnesium, potassium) to yield healthful mineral water, and pH control (hydrochloric or sulfuric acid) to aid with other filtration steps.

Figure 3A:
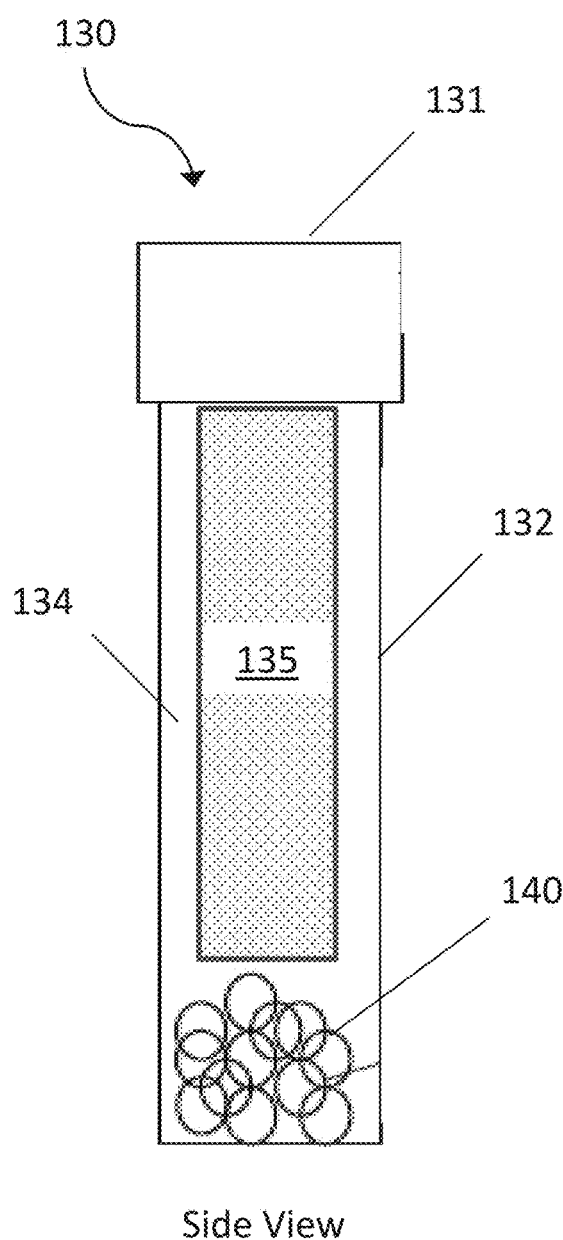
FIGS. 3A-3C and FIGS. 4A-4C show a capsule according to various embodiments of the present disclosure.
Figure 3B:
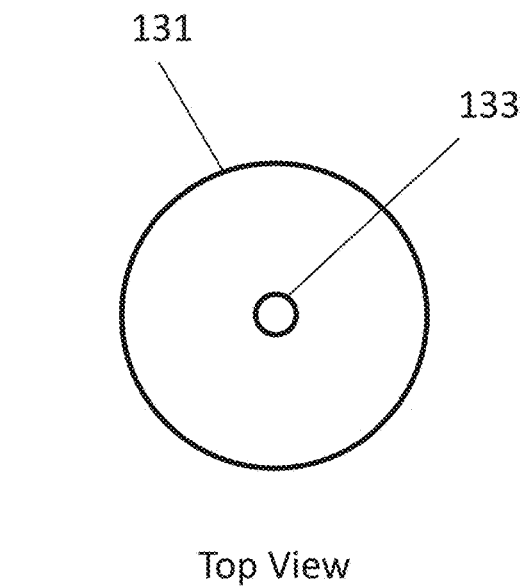
Figure 3C:
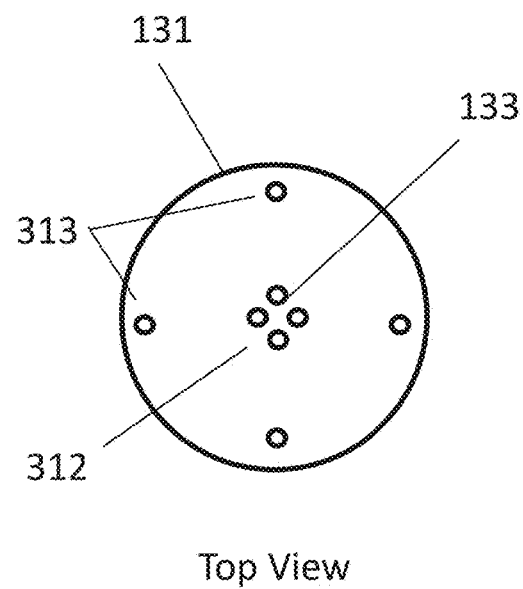

Referring first to FIGS. 3A-3C, in various embodiments, opening(s) 133 may be situated in closed top 131. As shown in FIG. 3B, in some embodiments, lid 131 may include a single, relatively large opening 133 while, in other embodiments, lid 131 may contain a plurality of relatively small openings 133 as shown in FIG. 3C. The size of opening 133 (or collective size of multiple openings 133) may be configured to control a rate at which additive 140 may diffuse through opening(s) 133 into static fluid volume 121 from capsule fluid volume 135. That is, the size of opening(s) 133 may be based on the desired diffusion rate over time. In various embodiments, the collective dimensions of the plurality of relatively small openings 133 may be substantially similar to the dimensions of the single opening 133 for a given desired diffusion rate. Controlling the diffusion rate may provide for passive dosing static fluid volume 121 to a predetermined concentration within a predetermined amount of time. FIG. 3C illustrates multiple smaller capsule openings 133 distributed about the lid upper surface 211. Depending on the fluid, it may be desirable to have cluster lid openings 312 and/or distributed lid openings 313 to obtain the desired area for additive 140 diffusions without creating holes large enough for eddies to form from fluid flowing in the external volume 320, which could promote a fluid exchange between capsule fluid 135 and flowing fluid volume 122 (later described in the context of FIG. 7E) as later described in more detail herein.

Figure 4A:
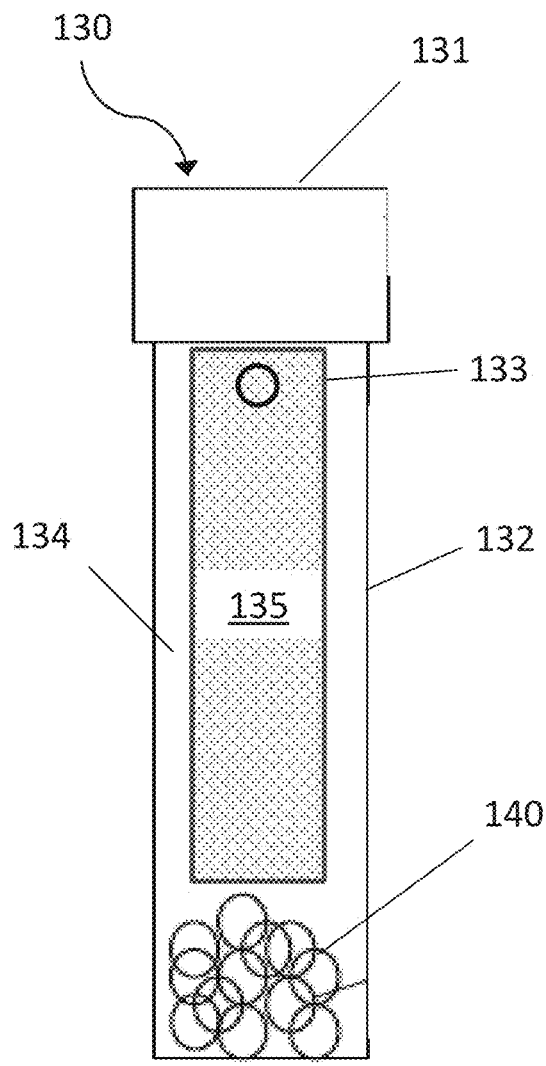
Figure 4B:
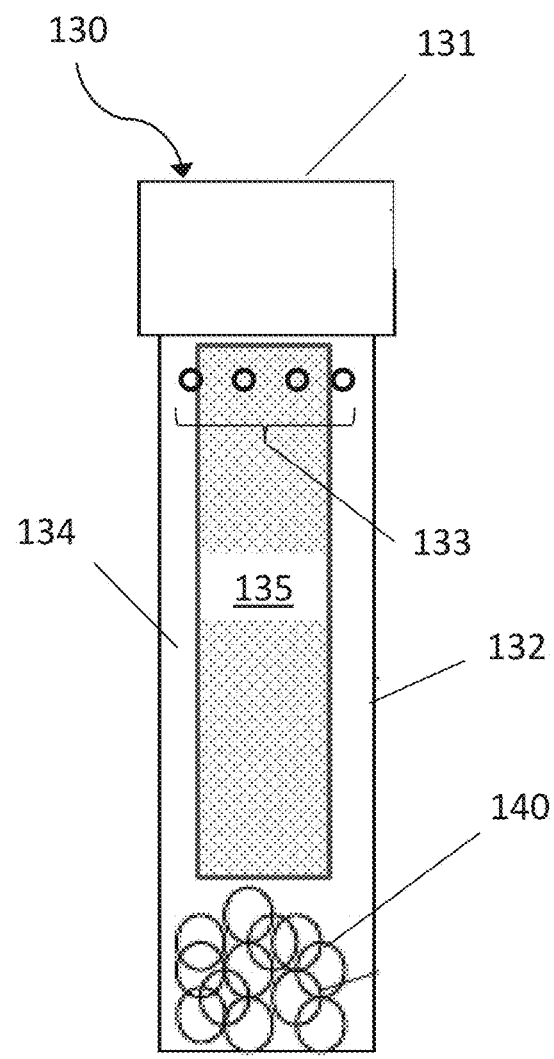
Figure 4C:
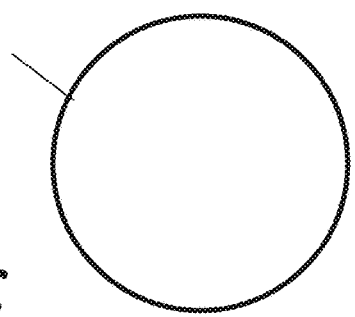

Referring now to FIGS. 4A-4C, in various embodiments, opening(s) 133 may instead be situated in capsule body 132. As shown in FIG. 4A, in some embodiments, capsule body 132 may include a single, relatively large opening 133 while, in other embodiments, capsule body 132 may contain a plurality of relatively small openings 133 as shown in FIG. 4B. In various embodiments, opening(s) 133 may be situated near closed top 131 as shown, as such placement is distal from the additive 140 and allows air within the capsule 130 to evacuate through buoyancy when the capsule 130 is initially filled with water. Similar to configurations in which opening(s) 133 is situated in closed top 131, the size of opening 133 (or collective size of multiple openings 133) may be configured to control a rate at which additive 140 may diffuse through opening(s) 133 into static fluid volume 121 from capsule fluid volume 135. That is, the size of opening(s) 133 may be based on the desired diffusion rate over time. In various embodiments, the collective dimensions of the plurality of relatively small openings may be substantially similar to the dimensions of the single opening for a given desired diffusion rate. Controlling the diffusion rate may provide for passive dosing static fluid volume 121 to a predetermined concentration within a predetermined amount of time.

The size and placement of opening(s) 133, in various embodiments, may be further configured to minimize transfer of additive 140 from capsule fluid reservoir 134 into fluid flowing past capsule 130 during use of fluid dispensing system 100.

In one aspect, the size of opening(s) 133 may be configured to minimize transfer of additive 140 from capsule fluid reservoir 134 into fluid flowing past capsule 130 during use of fluid dispensing system 100. Generally speaking, smaller openings 133 are less likely to create localized eddies/turbulence that would strengthen a pressure differential across each opening 133. Stated otherwise, if an opening 133 is too large, localized eddies/turbulence may generate a relatively stronger low-pressure zone outside of the opening 133 that may urge additive-containing fluid to exit capsule 130. Likewise, stirring up capsule fluid volume 135 may in turn disturb undissolved additive 140 contained within capsule fluid reservoir 134, which may result in undissolved additive 140 escaping capsule 130 through hole(s) 133, thereby dosing the flowing fluid and hastening consumption of additive 140. In various embodiments, a series of smaller openings 133 may be used to mitigate these effects.

Figure 5A:
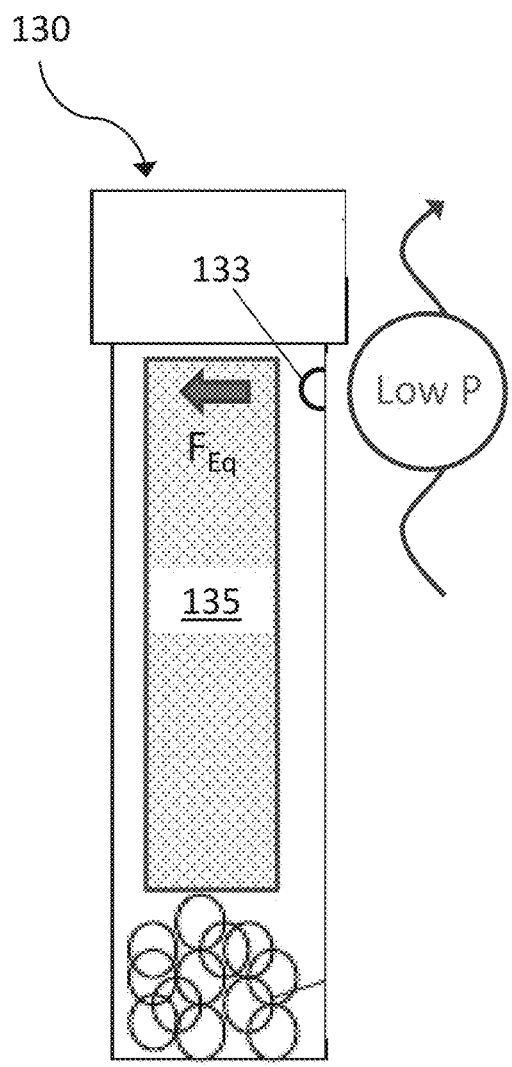
FIGS. 5A-5B illustrate representative pressures and forces associated with flowing fluid past a capsule having side opening(s).
Figure 6A:
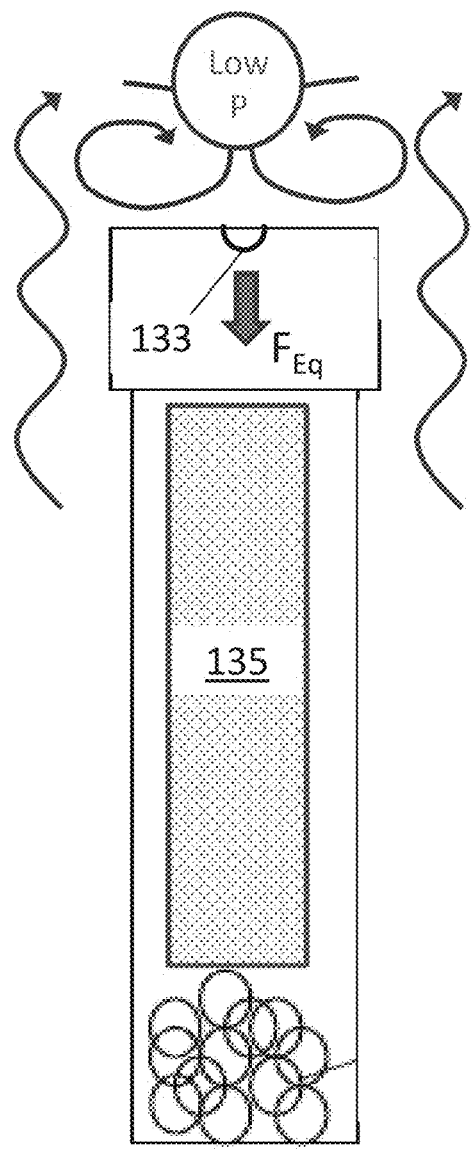
FIGS. 6A-6B illustrate representative pressures and forces associated with flowing fluid past a capsule having lid opening(s).

With reference to FIG. 5A and FIG. 6A, and without wishing to be bound by theory, in single-opening embodiments, forces seeking to establish equilibrium between the inside and outside of capsule 130 may resist outflow forces that may otherwise be generated by these localized low pressure zones formed by eddies/turbulence outside of the opening 133. Stated otherwise, because these embodiments of capsule 130 have only one opening 133, replacement fluid cannot be drawn into capsule 130 as fluid was drawn out through opening 133. Embodiments of capsule 130 having substantially rigid constructions may maintain structural integrity (i.e., will not collapse inwards) as the pressure lowers within capsule fluid reservoir 134 and thus it would be difficult for any low pressure zone generated by eddies/turbulence to overpower the resulting equilibrium force, much in the way it can be difficult to suck fluid through a straw out of a fully sealed bottle without another hole to allow the pressure to equalize. It should be appreciated that, while turbulence created in the wake of capsule 130 may create a low pressure zone proximate the face of closed top 131, the absence of an upstream opening(s) would minimize a pressure differential between capsule fluid reservoir 134 and the wake regardless of the number and size of openings 133 in closed top 131, much in the way it is difficult to suck fluid out of a sealed bottle without a hole to equalize the pressure.

Figure 5B:
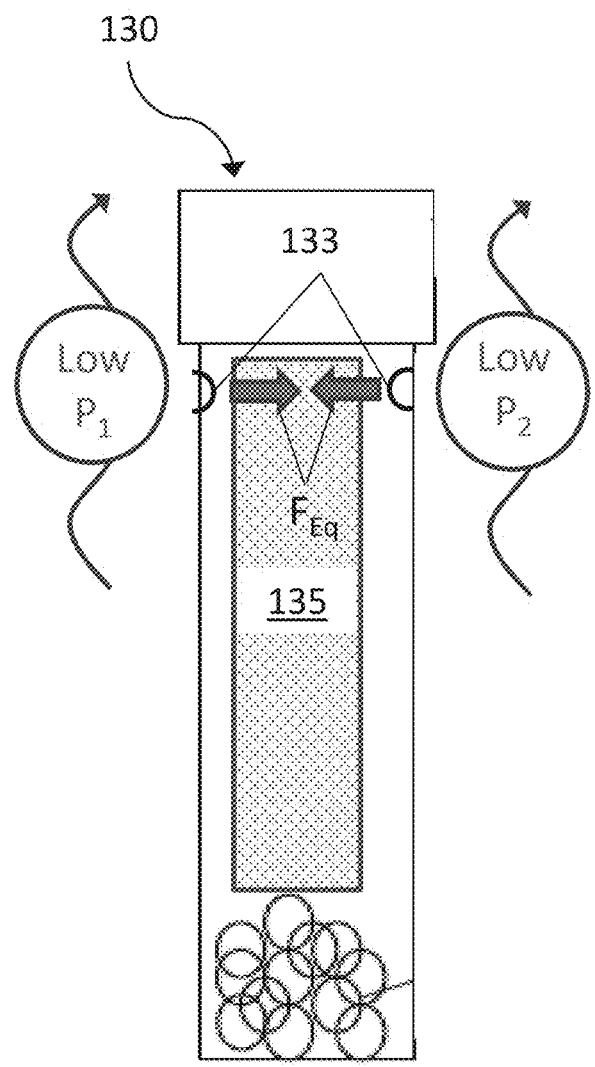
Figure 6B:
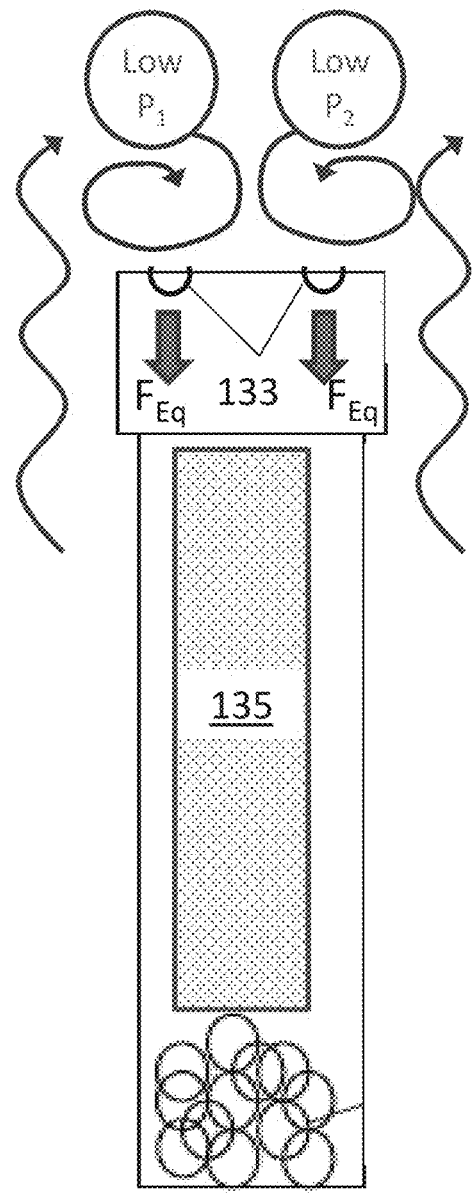

With reference to FIG. 5B and FIG. 6B, and without wishing to be bound by theory, multi-opening embodiments may be configured to leverage equilibrium forces in a similar manner to minimize transfer of additive 140 from capsule fluid reservoir 134 into fluid flowing past capsule 130 during use of fluid dispensing system 100. To be effective, openings 133 should be sized and positioned such that low-pressure zones generated outside of each opening are substantially similar. In this way, no one outflow force can overcome the other(s) and create a pressure differential that draws fluid in through one opening and out the other opening. In various embodiments, this may be achieved by positioning similarly sized openings 133 at the same approximate lengthwise position on capsule body 132. As configured, localized flow at each opening 133 is likely to behave substantially the same and thereby generate counteracting outflow forces. Resulting equilibrium forces may counteract these outflow forces, thereby minimizing undesired fluid exchange. If instead capsule 130 were configured with a first opening 133a in capsule body 132 and a second opening 133b either further downstream in capsule body 132 or in closed top 131 (configuration not shown), localized flow at each opening 133a, 133b may differ, resulting in a pressure differential that for example draws fluid into capsule 130 through first opening 133a and out of capsule 130 through second opening 133b.

In another aspect, aligning opening(s) 133 to be flush with local flow may help minimize transfer of additive 140, as fluid flowing along an outer surface of capsule body 132 is more likely to bypass opening(s) 133 without being forced or drawn therethrough. For example, positioning opening(s) 133 through the side wall of body 132 may promote laminar flow and situate the opening(s) such that local flow would have to turn sharply (e.g., turn 90 degrees) in order to enter opening(s) 133. Likewise, positioning opening(s) 133 through closed top 131 may act to shield opening(s) 133, as fluid flowing along the side wall of capsule body 132 would have to turn sharply (e.g., turn 180 degrees) upon passing the downstream end of capsule 130 (i.e., closed top 131) in order to enter opening(s) 133. Absent a strong pressure differential, flow is generally more likely to skirt past openings 133 positioned in capsule body 132 or in closed top 131.

Operation of Fluid Dispensing System 100

FIGS. 7A-7E illustrate various steps in a representative operation of fluid dispensing system 100.

FIG. 7A illustrates a representative initial setup and operation of fluid dispensing system 100. Capsule 130 may be placed inside fluid reservoir 120 and, optionally, mounted or otherwise secured therein. In the embodiment shown, capsule 130 is situated cap-up and is secured to the bottom of fluid reservoir 120. Positioning capsule 130 in this manner may help situate opening(s) 130 low enough within fluid reservoir 120 to ensure opening(s) 130 are submerged in static fluid volume 121, while also causing diffusion to emanate from a relatively central portion of the water column defined by static fluid volume 121, thereby promoting relatively uniform dispersion of additive 140 throughout static fluid volume 121. Further, in embodiments in which opening(s) 133 are situated in closed top 131, positioning capsule 130 cap-up positions opening(s) 133 at the downstream end of capsule 130 where they are shielded from the ram effect and turbulence of streamwise flow as previously described, much like trout are protected from strong currents in a river when they hug the downstream side of a rock where the local water is relatively calm (assuming flow of flowing fluid volume 122 in an upwards direction within fluid reservoir 120). Fluid, represented by horizontal arrows, enters filter 110 through one or more pores in elongated body 113, which may comprise one or more filter elements (e.g., carbon, mesh, etc.).

Referring now to FIG. 7B, the fluid entering through filter element 110 collects in fluid reservoir 120 defined by hollow core 114. When the fluid level reaches opening(s) 133 in capsule 130, a portion of the fluid enters capsule 130 through opening(s) 133, displacing the air within capsule fluid reservoir 134. Fluid may continue to collect within and ultimately fill capsule reservoir 134 with a capsule fluid volume 135.

Figure 7C:
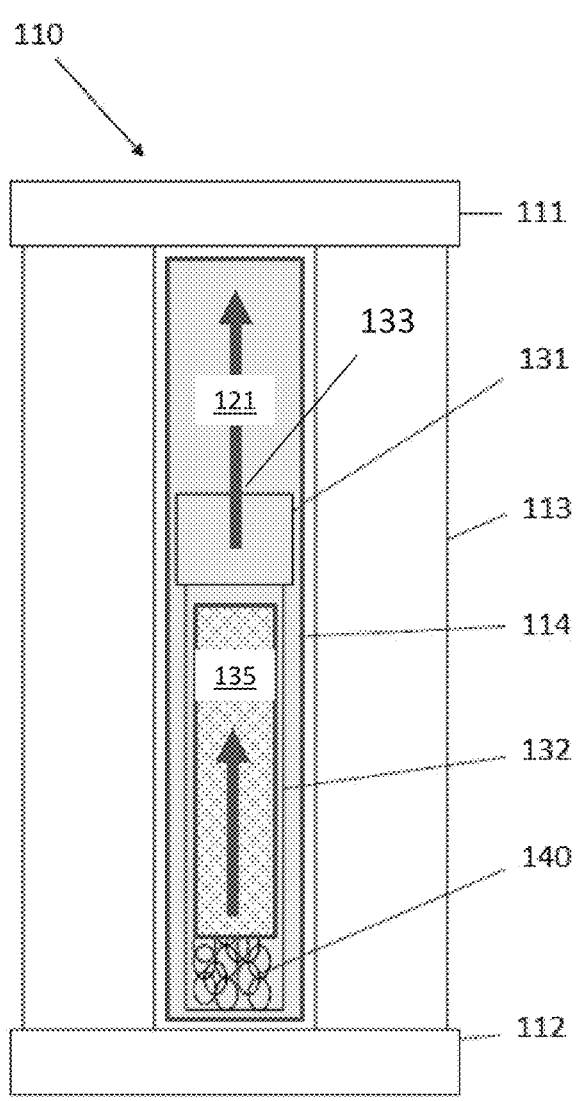
FIG. 7C depicts a portion of a solid additive 140 dissolving and diffusing throughout fluid in the capsule and the fluid reservoir.

Referring now to FIG. 7C, a portion of solid additive 140 in contact with capsule fluid volume 135 dissolves and diffuses throughout capsule fluid volume 135, as illustrated by the lower arrow. Over time, capsule fluid volume 135 may become saturated with dissolved additive 140. As more time passes, dissolved additive 140 in saturated fluid volume 135 may diffuse out of capsule 130 and into static fluid volume 121 in hollow core 114, thereby passively dosing static fluid volume 121 with dissolved additive, as illustrated by the upper arrow. Depending on how much time passes, static fluid volume 121 may eventually become fully saturated with dissolved additive 140 as well. In some embodiments, the concentration of dissolved additive 140 present in static fluid volume 121 may be controlled by controlling one or a combination of several parameters including, without limitation, a duration for which static fluid volume 121 is permitted to be stored in hollow core 114, a dissolution rate of additive 140, the size (i.e., volume) of static fluid volume 121, the size (or collective size) of opening(s) 133 in capsule 130, the temperature of the fluid, and the density of the fluid, amongst other parameters that will be apparent to one of ordinary skill in the art, as further described in more detail herein. It should be appreciated that by limiting the volume of fluid permitted to contact solid additive 140 in capsule 130, and by keeping that volume relatively undisturbed (e.g., shielding it from flowing fluid volume 122, later described) much like a marina protects boats from rough waters, the rate at which solid additive 140 is consumed can be reduced such that capsule 130 need not be refreshed with additional additive 140 as often as may be the case were solid additive 140 permitted to freely associate with the larger static fluid volume 121 in fluid reservoir 120. Similarly, once both capsule fluid volume 135 and static fluid volume 121 is saturated, further dissolution of solid additive 140 may cease as the fluid can no support additional concentration of dissolved mass. This prevents further degradation of additive 140 while the system is not in use.

Figure 7D:
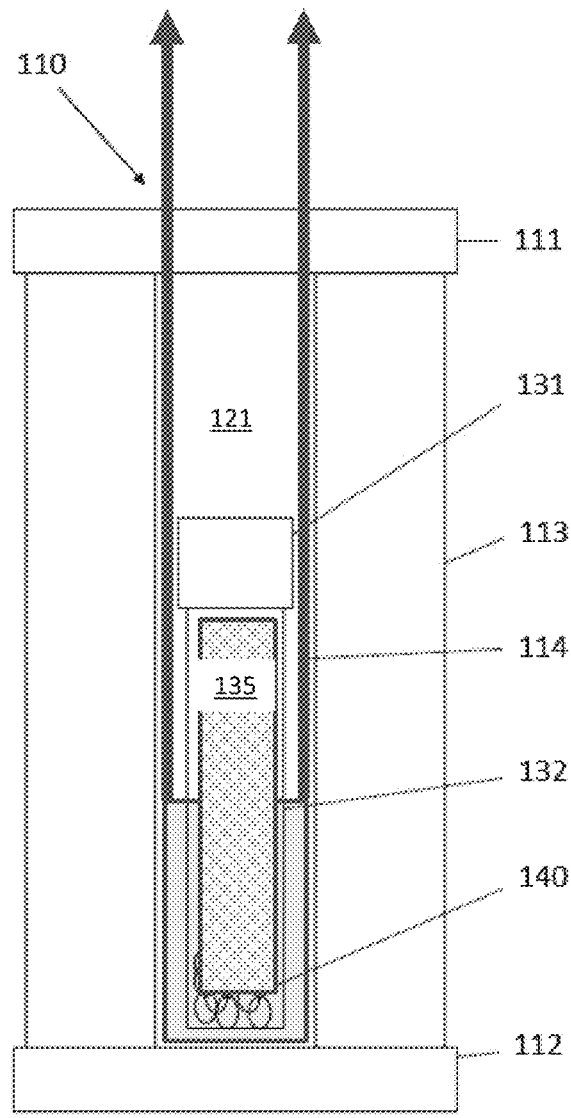
FIG. 7D illustrates a passively dosed static fluid volume being displaced out of the fluid reservoir.

Referring now to FIG. 7D, when a user wishes to dispense fluid from fluid dispensing system 100, passively dosed static fluid volume 121 may be displaced out of hollow core 114 through one or more openings in top cap 111 by new water entering the core, as represented by the vertical arrows. Notably, despite the introduction of new water, saturated capsule fluid volume 135 largely remains behind in capsule fluid reservoir 134 due to capsule 130 resistance to equalization, as previously described. It should be appreciated that, by retaining saturated capsule fluid volume 135 in capsule 130, the process of passively dosing a new static fluid volume 121 after the current use of fluid dispensing system 100 need not start from scratch. This may reduce the time needed to passively dose the new static fluid volume 121 to a desired concentration, as well as reduce consumption of solid additive 140.

Figure 7E:
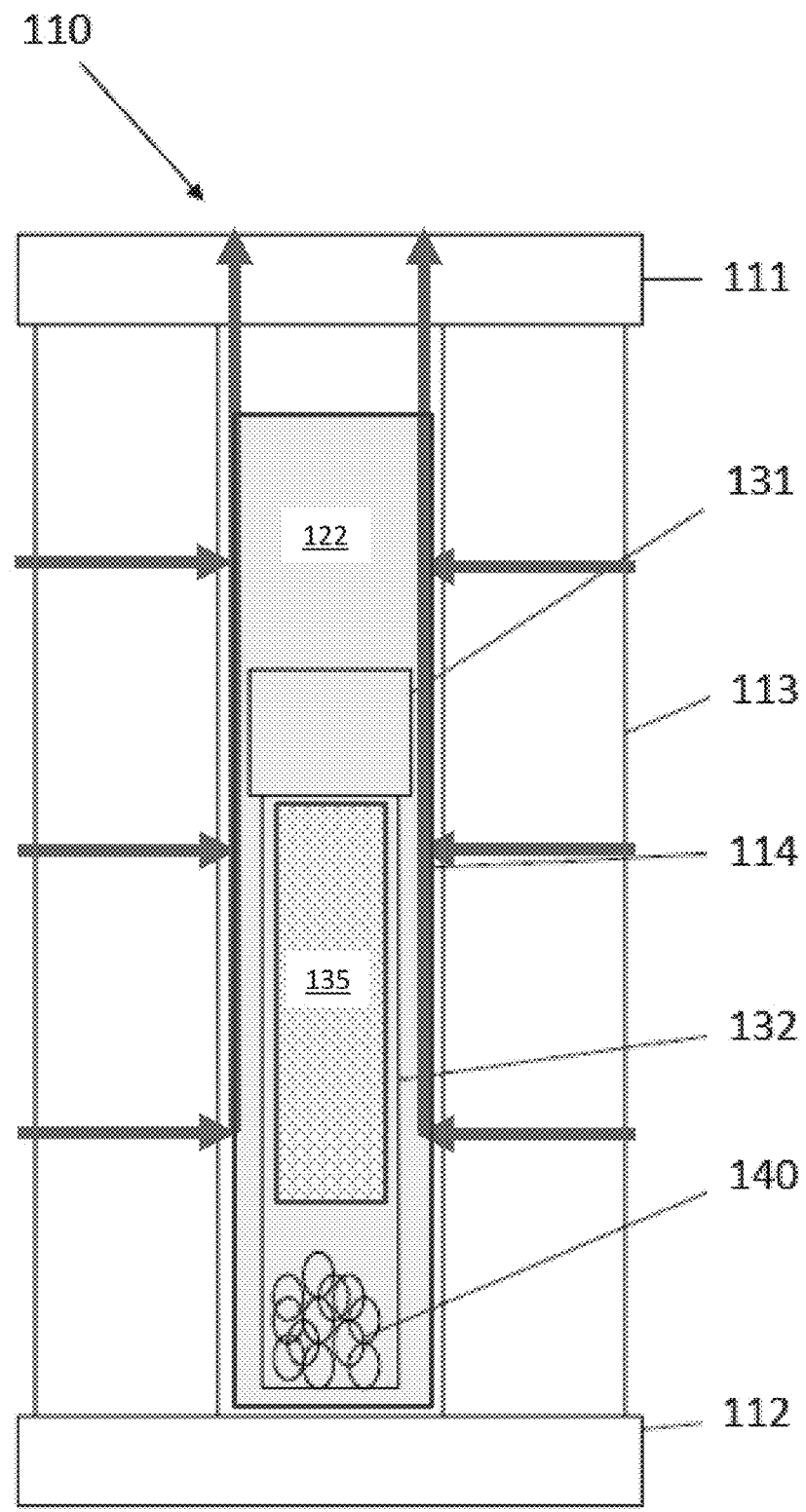
FIG. 7E shows fresh, non-dosed fluid being directed through the filter element and out of the fluid reservoir.

Referring now to FIG. 7E, during or after dispensing passively dosed static fluid volume 121, fresh, non-dosed fluid may be directed through filter element 110 and into hollow core 114, as illustrated by the horizontal arrows. This volume, referred to herein as "flowing fluid volume 122", is continuously evacuated from hollow core 114 for dispensing. As such, flowing fluid volume 122 flows past capsule 130 while largely avoiding uptake of any dissolved or solid additive 140 residing within capsule 130 due to the design of capsule 130 as previously described. Although there is continuous fluid flow through filter element 110 and out of hollow core 114 (shown by a combination of horizontal and vertical lines) the concentration of dissolved additive 140 within capsule fluid volume 135 remains substantially constant. The additive 140 dissolves into capsule fluid volume 135 between each use of fluid dispensing system 100 (and then diffuses into new static fluid volumes 121), but additive 140 is not dissolved by or during the flow of fluid through fluid dispensing system 100 unlike prior art systems. This allows for a controlled, consistent, time-based discharge of additive 140 (dependent on various parameters, as previously and later described herein) into static fluid in the system between uses, as opposed to relatively uncontrolled, inconsistent discharge of additive into a fluid flow as undertaken by the prior art. Notably, saturated capsule fluid volume 135 largely remains behind in capsule fluid reservoir 134 subsequent to dispensing both volumes of fluid (i.e., static fluid volume 121 and flowing fluid volume 122) from fluid dispensing system 100. As configured, once capsule fluid volume 135 becomes saturated during initial use, it may remain substantially saturated until all of the solid additive 140 is consumed. The term "substantially saturated" includes small exchanges with static fluid volume 121 and/or flowing fluid volume 122 that are the result of the diffusion process and that exchange is limited to a rate proportional to the area of opening 133. In other words, any exchange of fluid between the two volumes primarily results from diffusion rather than the flow of fluid around the capsule 130.

Controlling Passive Dosing

Attention is now drawn to a discussion on the principles of the system's diffusion mechanism and how to determine the proper amount of additive to diffuse over a given time. While there are several variables controlling an additive's solubility and rate of diffusion throughout a volume of fluid, we will begin with a simplified example.

As configured, fluid dispensing system 100 may control the overall concentration of dissolved additive 140 present in the total volume of fluid dispensed by controlling the volumes and concentrations of dissolved additive 140 in each of static fluid volume 121 and flowing fluid volume 122. Generally speaking, as illustrated in FIGS. 7A-7E, static fluid volume 121 ($V_{Static}$) is passively dosed with a first concentration of additive 140 prior to being dispensed ($C_{Static}$) and flowing fluid volume 122 ($V_{Flowing}$) remains largely undosed (the term "largely undosed" includes possible escape of saturated fluid from capsule 130 into flowing fluid volume 122, which is negligible compared to the volume of flowing fluid volume 122) and has a second concentration of additive 140 ($C_{Flowing}$). Thus, the total volume of fluid dispensed from system ($V_{Total}$) is $V_{Static}$+ $V_{Flowing}$. Accordingly, the resultant concentration of additive in $V_{Total}$ may be the volumetric weighted average of $C_{Static}$ and $C_{Flowing}$.

Because the overall concentration of dissolved additive 140 present in $V_{Total}$ ($C_{Total}$) may be a function of $V_{Static}$, it follows that controlling $V_{Static}$ can be used to control $C_{Ttotal}$. In various embodiments, fluid dispensing system 100 may be configured to control $V_{Static}$ (and thus $C_{Ttotal}$) by increasing or decreasing the size of capsule 130 relative to fluid reservoir 120 (e.g., hollow core 114). In other words, by increasing the size of capsule 130, the available space in fluid reservoir 120 decreases, and thus static fluid volume 121 decreases. All things remaining the same, the resultant portion of $V_{Total}$ that has been passively dosed with dissolved additive 140 thereby decreases, such that $C_{Total}$ decreases as well. Likewise, by decreasing the size of capsule 130, the available space in fluid reservoir 120 increases, and thus static fluid volume 121 increases. All things remaining the same, the resultant portion of $V_{Total}$ that has been passively dosed with dissolved additive 140 thereby increases, such that $C_{Total}$ increases as well.

Knowing this, a user is able to select an appropriately sized capsule 130 for achieving a desired $C_{Total}$ for its particular fluid dispensing system and typical usage. For example, consider a user that has a fluid dispensing system 100 having a one liter fluid reservoir 120 ($V_{Reservoir}$), and that the user typically dispenses two liters per usage ($V_{Total}$) at half hour intervals. If the user seeks to have a $C_{Total}$ of five percent in the two liters of dispensed fluid during each usage, and the particular additive 140 is fast diffusing such that it saturates the fluid in fluid reservoir 120 ($V_{Static}$) in less than a half hour, then $V_{Static}$ may be calculated as (assuming $C_{Flowing}$ is negligible):

$$V_{Static}=(1/(C_{Static}/C_{Total}))*V_{Total}$$

Knowing $V_{Reservoir}$ and $V_{Static}$, the user may identify an appropriately sized capsule as the difference between $V_{Reservoir}$ and $V_{Static}$. One of ordinary skill in the art will recognize how to identify an appropriately sized vessel for variations of the parameters above based on the relationships and other disclosure provided herein.

Further parameters and relationships may be considered in controlling passive dosing of fluid dispensed from fluid dispensing system 100. In this discussion, how quickly the solid dissolves and diffuses into the surrounding volume of water is represented as the diffusion flux, a. The diffusion coefficient in the following equations has been simplified as variable D, however there are many contributing factors which the value D can represent (e.g., time, temperature, pressure and solubility).

Shortly after the dissolving process begins the additive will be in a liberated soluble aqueous state and can diffuse throughout the surrounding volume of water. This change in concentration is represented with –dc. The change in the concentration varies over a distance represented by dx. Overall, this diffusion rate and concentration gradient is described in the following Equation 1:

$$\alpha_1=D*(-dc/dx)$$

$\alpha_1$=concentration flux
D=diffusion coefficient of additive
(–dc/dx)=change in additive concentration over change in distance As shown in FIG. 4, the additive 140 is contained in a capsule 130 which is contained in the fluid reservoir 120 of the filter element 110. The concentration of the additive 140 now dispersed throughout the capsule fluid reservoir 134 can be represented as below in Equation 2.

$$c_1*v_1$$

$c_1$=concentration of additive inside capsule fluid reservoir at time per $\alpha_1$
$v_1$=volume of capsule containing additive The resulting concentration of additive 140 in the fluid reservoir 120 depends on the surface area of opening(s) 133 in the closed top 131 or capsule body 132. How much additive 140 will diffuse from the capsule 130 into the fluid reservoir 120 is represented below in Equation 3:

$$\alpha_2=D*(-dc/dx)$$

$\alpha_2$=concentration of additive in the fluid reservoir
D=diffusion constant
(–dc/dx)=concentration flux (change in additive concentration over change in distance)

Similar to Equation 2 above the concentration of the additive 140 now dispersed throughout the fluid reservoir 120 is represented below in Equation 4.

$$c_2*v_2$$

$c_2$=concentration of additive inside fluid reservoir per $\alpha_2$ (time)
$v_2$=volume of fluid reservoir After a given time the capsule concentration and fluid reservoir 120 concentration will reach an equilibrium. Once a user begins operation of the fluid dispensing system 100 by flowing fluid (e.g., water) through the filter element 110, the concentration of additive 140 that has been diffused to the fluid reservoir 120 will exit the fluid reservoir 120 and enter the user's vessel (e.g., a coffee pot; not shown). The concentration of additive 140 in the capsule 130 will substantially remain the same as the fluid flow path does enter the capsule. Equation 5 conveys the final concentration of additive 140 in the user's vessel:

$$c_3*v_3$$

$c_3$=concentration of additive inside user vessel
$v_3$=volume of user vessel

Combining Equations 4 & 5 the concentration in the user's vessel can be more easily calculated using the resulting Equation 6.

$$(v_2*c_2)/v_3=c_3$$

$c_2$=concentration of additive inside fluid reservoir per $\alpha_2$ (time)
$v_2$=volume of fluid reservoir $c_3$=target concentration of additive inside user vessel
$v_3$=volume of user vessel Diffusion Example The additive 140 in the following example is a lime scale inhibitor (LSI) in the form of disodium phosphate with a molecular weight of 177.99 g/mol and a solubility of 0.12 g/ml @ 20° C. The capsule 130 has an outer diameter (OD) of 2.5 cm and a height of 10 cm, where the 10 cm height represents dx. In the following example the diffusion coefficient D was determined from experimentation and referenced with literature to be 5.2E-08 cm$^2$/s. Changing units of the LSI to mol/cm$^3$ results in a value of 6.63E-04: this represents –dc. As shown in FIG. 4, the additive 140 is sitting at the bottom of the capsule 130.

After calculation the flux of this system, $\alpha_1$ is –3.45E-09 mol/(cm$^2$/s).

$$\alpha_1 = D^*(-dc/dx)$$

$$-3.45\text{E-}12 \text{ mol}/(\text{cm}^2/s) = 5.2\text{E-}08 \text{ cm}^2/s^*(-6.63\text{E-}04 \text{ mol/cm}^3/10 \text{ cm})$$

Because filter use is generally sporadic, the concentration is targeted for performance and best user experience within a 24 hr period. In this example, the optimal concentration for this particular additive is 1-2 mg/L. The fluid reservoir 120 volume*$v_2$ is 32 mL, and the target user vessel volume $v_3$ is 236.56 mL Using Equation 6 from above and using 2 mg/L for the vessel additive concentration $c_3$ it is evident after calculation that the target concentration in the fluid reservoir 120 should be roughly 15 mg/L.

$$(c_2^*v_2)/v_3 = c_3$$

$$[(15 \text{ mg/L})^*(32 \text{ mL})]/(236.56 \text{ mL}) = 2.0 \text{ mg/L}$$

Now that the flux is calculated (the amount of additive movement per area per time) as well as the target concentration of additive in the fluid reservoir 120 $c_3$ for optimal performance and user experience, the time needed to reach this concentration is considered. Referencing the units from flux above it can be determined that there are several variables: area, mol, and time:

$$\text{flux}=\text{mol}/(\text{cm}^2/s)$$

$$\text{flux}=\text{mol}/(\text{capsule area}^*\text{time})$$

Rearranging the equation above to solve for time yields:

$$\text{time}=\text{mol}/(\text{capsule area}^*\text{flux})$$

The time needed to diffuse an optimal concentration of 15 mg/L to the fluid reservoir 120 can be solved as shown below.

$$1.15\text{E+}05 \text{ s} = 1.95\text{E-}06 \text{ mol}/(4.91 \text{ cm}^{2*}[3.45\text{E-}12 \text{ mol}/(\text{cm}^{2*}s)])$$

The value 1.15E+05 seconds corresponds to roughly 32 hours. Rearranging again and using 24 hrs (8.64E+04 s) instead of 32 results in 11 mg/L in the fluid reservoir 120 within that time period:

$$\text{mol}=\text{time}^*\text{capsule area}^*\text{flux}$$

$$1.46\text{E-}06 \text{ mols} = 8.64\text{E+}04 \text{ s}^*4.91 \text{ cm}^{2*}3.45\text{E-}12 \text{ mol}/[\text{cm}^{2*}s]$$

$$1.46\text{E-}06 \text{ mols}=11 \text{ mg/L}$$

This corresponds to 1.5 mg/L in the user's vessel:

$$[(11 \text{ mg/L})^*(32 \text{ mL})]/(236.56 \text{ mL})=1.5 \text{ mg/L}$$

The subject matter described herein are directed to technological improvements to the field of fluid additives by extending the life of a fluid capsule. It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the system has been described above in connection with particular embodiments and examples, the system is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the system are set forth in the following claims.

What is claimed is:

1. A fluid dispensing system comprising:
a filter element comprising a hollow core defining a fluid reservoir; and
a capsule comprising an elongate body, a closed top, a closed bottom, a side wall, and an interior, the capsule situated within the fluid reservoir and configured to contain an additive material in the interior, the capsule having:
  (i) a size configured to allow a predetermined volume of fluid to collect within the fluid reservoir ("static fluid volume"), and
  (ii) one or more openings configured to control a rate at which the additive material passively diffuses into the static fluid volume from a volume of fluid within the capsule ("capsule fluid volume"), such that the static fluid volume is passively dosed with the additive material prior to being dispensed from the fluid dispensing system, and
wherein, during each use, the fluid dispensing system is configured to dispense the passively dosed static fluid volume and a volume of flowing fluid ("flowing fluid volume"), such that the total volume of fluid dispensed from the fluid dispensing system has a predetermined concentration of the additive material ("total concentration") proportional to the concentration of the additive in the passively dosed static fluid volume ("static concentration") and the relative volume of the static fluid volume,
wherein the one or more openings are positioned either in the closed top or in the side wall and, in such cases where the one or more openings comprise more than one opening, each of the openings being at approximately the same lengthwise position on the capsule, thereby minimizing a pressure differential between the interior of the capsule and the fluid reservoir as the flowing fluid volume flows by the capsule.

2. The fluid dispensing system of claim 1, wherein the closed top is a removable lid.

3. The fluid dispensing system of claim 1, wherein the one or more openings are configured to minimize transfer of the additive material from the capsule to the flowing fluid volume.

4. The fluid dispensing system of claim 1, wherein a capsule fluid reservoir volume (CFRV) and a collective diameter of the one or more openings (COD) are selected according to the following equation:

$$COD = CFRV * 0.005.$$

5. The fluid dispensing system of claim 1, wherein, to achieve a total concentration of 10 µg/L-1000 mg/L using the additive material having a solubility of 1 µg/L-1000 g/L in a total volume of 10-1,000,000 gallons fluid to be dispensed from the fluid dispensing system having a fluid reservoir volume of 1-1000 cm3, a capsule volumetric size is 2-999 cm3, and collective size of the one or more openings (COD) is 1-26 mm.

6. The fluid dispensing system of claim 1, wherein the additive material comprises a scale inhibitor and the fluid comprises water.

7. A method for dosing a fluid with an additive material, the method comprising:
inserting a capsule into a fluid reservoir defined within a hollow core of a filter element, the capsule comprising an elongate body having a closed top, a closed bottom, a side wall, and an interior, the capsule containing an additive material and having a size configured to allow a predetermined volume of fluid to collect within the fluid reservoir ("static fluid volume");
allowing the additive material to passively diffuse from a volume of fluid within the capsule ("capsule fluid volume") into the static fluid volume through one or more openings in the capsule to passively dose the static fluid volume with a concentration of the additive material ("static concentration");
dispensing the passively dosed static fluid volume from the fluid reservoir; and
directing a volume of fluid through the fluid reservoir ("flowing fluid volume"),
wherein the one or more openings are positioned either in the closed top or in the side wall and, in such cases where the one or more openings comprise more than one opening, each of the openings being at approximately the same lengthwise position on the capsule, thereby minimizing a pressure differential between the interior of the capsule and the fluid reservoir as the flowing fluid volume flows by the capsule, and
wherein the static fluid volume and the static concentration are selected to impart the total volume of fluid dispensed from the fluid dispensing system with a predetermined concentration of the additive material ("total concentration").

8. The method of claim 7, wherein the size of the capsule is selected as the difference between a volume of the fluid reservoir and the static fluid volume.

9. The method of claim 7, wherein allowing the additive material to diffuse includes allowing a predetermined period of time to pass.

10. The method of claim 9, wherein the predetermined period of time is selected based on at least one or a combination of the desired static concentration, a solubility of the additive material, a temperature of the fluid, a density of the fluid, pH, and electrical impedance.

11. The method of claim 7, wherein directing a volume of fluid through the fluid reservoir occurs at least partially concurrent with dispensing the passively dosed static fluid volume from the fluid reservoir.

12. The method of claim 7, wherein directing a volume of fluid through the fluid reservoir occurs subsequent to dispensing the passively dosed static fluid volume from the fluid reservoir.

13. The method of claim 7, wherein a capsule fluid reservoir volume (CFRV) and a collective diameter of the one or more openings (COD) are selected according to the following equation:

$$COD = CFRV * 0.005.$$

14. The method of claim 7, wherein, to achieve a total concentration of 10 μg/L-1000 mg/L using the additive material having a solubility of 1 μg/L-1000 g/L in a total volume of 10-1,000,000 gallons fluid to be dispensed from the fluid dispensing system having a fluid reservoir volume of 1-1000 cm3, a capsule fluid reservoir volume (CFRV) is 2-999 cm3 and the collective size of the one or more openings (COD) is 1-26 mm.

15. The method of claim 7, wherein the additive material comprises a scale inhibitor and the fluid comprises water.

* * * * *